United States Patent
van Rensburg

(10) Patent No.: US 8,396,006 B2
(45) Date of Patent: Mar. 12, 2013

(54) SYSTEM AND METHOD FOR ENABLING WIRELESS COMMUNICATIONS WITH CELL COORDINATION

(75) Inventor: Cornelius van Rensburg, Wylie, TX (US)

(73) Assignee: FutureWei Technologies, Inc., Plano, TX (US)

( * ) Notice: Subject to any disclaimer, the term of this patent is extended or adjusted under 35 U.S.C. 154(b) by 460 days.

(21) Appl. No.: 12/686,043

(22) Filed: Jan. 12, 2010

(65) Prior Publication Data

US 2010/0177725 A1   Jul. 15, 2010

Related U.S. Application Data

(60) Provisional application No. 61/144,370, filed on Jan. 13, 2009.

(51) Int. Cl.
*H04W 36/00* (2009.01)

(52) U.S. Cl. ........ 370/252; 370/329; 370/437; 455/436; 455/450; 342/368

(58) Field of Classification Search .................. None
See application file for complete search history.

(56) References Cited

U.S. PATENT DOCUMENTS

| | | | |
|---|---|---|---|
| 7,274,330 | B2 | 9/2007 | Lee |
| 7,274,936 | B2 | 9/2007 | Zangi et al. |
| 7,373,176 | B2 | 5/2008 | Chotkowski et al. |
| 8,041,313 | B2 | 10/2011 | Van Rensburg et al. |
| 2004/0224637 | A1 | 11/2004 | Silva et al. |
| 2005/0014540 | A1 | 1/2005 | Shim |
| 2005/0057394 | A1 | 3/2005 | Lee |
| 2008/0020715 | A1 | 1/2008 | Zangi et al. |
| 2009/0147869 | A1 | 6/2009 | Duan et al. |
| 2009/0253387 | A1 | 10/2009 | Van Rensburg et al. |
| 2010/0151871 | A1* | 6/2010 | Zhang et al. .............. 455/450 |
| 2010/0284359 | A1* | 11/2010 | Kim et al. ................ 370/329 |

FOREIGN PATENT DOCUMENTS

| | | |
|---|---|---|
| CN | 1551519 A | 12/2004 |
| WO | WO 2007/02351 A1 | 3/2007 |

OTHER PUBLICATIONS

"Schedule Single vs. Multiple Beams Per Frame for E-UTRA," 3GPP TSG RAN WG1 Meeting #46, R1-062282, Discussion, Aug. 28-Sep. 1, 2006, 5 pages, Ericsson, Tallin, Estonia.

Fujishima, K. et al., "Technical Proposal for IMT-Advanced," REV-080009, 3GPP TSG RAN IMT-Advanced Workshop, Apr. 7-8, 2008, 24 pages, Hitachi, Ltd., Shenzhen, China.

Saur, S., et al., "Grid-of-Beams (GoB) Based Downlink Multi-User MIMO," IEEE 802.16 Broadband Wireless Access Working Group, May 5, 2008, pp. 1-4, Alcatel-Lucent Bell Labs, Germany.

"LTE-Advanced—Coordinated Multipoint Transmission/Reception," TSG-RAN WG1 #53bis, R1-082469, Discussion, Jun. 30-Jul. 4, 2008, 6 pages, Ericsson, Warsaw, Poland.

(Continued)

*Primary Examiner* — Chi H. Pham
*Assistant Examiner* — Shick Hom
(74) *Attorney, Agent, or Firm* — Slater & Matsil, L.L.P.

(57) ABSTRACT

A system and method for enabling wireless communications with cell coordination is provided. A method for communications controller operation includes transmitting a reference signal, and receiving a report from at least one communication device. The communications device is served by the communications controller, and the report includes an indicator of a preferred precoding matrix. The method also includes receiving a downlink (DL) transmission intended for the communications device, scheduling a transmission opportunity for the communications device, and transmitting the DL transmission to the communications device. The scheduling is based on the received report, and the received transmission is transmitted at an occurrence of the transmission opportunity.

24 Claims, 9 Drawing Sheets

OTHER PUBLICATIONS

"Proposal for LTE-Advanced Technologies," 3GPP TSG RAN WG1 Meeting #53bis, R1-0825, Discussion, Jun. 30-Jul. 4, 2008, pp. 1-36, NTT DoCoMO, Inc., Warsaw, Poland.

"DL Coordinated Beam Switching for Interference Management in LTE-Advanced," 3GPP TSG RAN WG1 #54, R1-083236, Discussion, Aug. 18-22, 2008, 6 pages, Huawei, Jeju, Korea.

"Inter-Cell Interference Mitigation Through Limited Coordination," 3GPP TSG RAN WG1 Meeting #54, R1-082886, Discussion and Decision, Aug. 18-22, 2008, 8 pages, Samsung, Jeju, Korea.

"DL Coordinated Beam Switching for Interference Management in LTE-Advanced," 3GPP TSG WG1 #54bis, R1-083710, Discussion, Sep. 29-Oct. 3, 2008, 7 pages, Huawei, Prague, Czech Republic.

Baumgartner, T., et al., "Performance of Downlink Beam Switching for UMTS FDD in the Presence of Angular Spread," IEEE International Conference on Communications (ICC 2002), Aug. 2002, pp. 851-855, vol. 2, IEEE.

Liao, W.-J., et al., "A Novel Beam Switching Antenna using RF Switches," IEEE Antennas and Propagation Society International Symposium, Jun. 9-15, 2007, pp. 5865-5868, IEEE, Honolulu, HI.

Love, D., et al., "On the Probability of Error of Antenna-Subset Selection With Space-Time Block Codes," IEEE Transactions on Communications, Nov. 2005, pp. 1799-1803, vol. 53, No. 11, IEEE.

Pedersen, K., et al., "Application and Performance of Downlink Beamforming Techniques in UMTS," IEEE Communications Magazine, Oct. 2003, pp. 134-143, vol. 41, No. 10, IEEE Communications Society.

Sanayei, S., et al., "Antenna Selection in MIMO Systems," IEEE Communications Magazine, Oct. 2004, pp. 68-73, vol. 42, No. 10, IEEE Communications Society.

Zeng, X., et al., "Performance Bounds for Space-Time Block Codes with Antenna Selection," International Symposium on Information Theory, ISIT Proceedings, Jun. 27-Jul. 2, 2004, pp. 339, IEEE, Chicago, IL.

"Written Opinion and International Search Report," PCT Application No. PCT/CN2010/070163, Applicant: Huawei Technologies Co., Ltd.,et al., mailed Apr. 22, 2010, 6 pages.

* cited by examiner

SYSTEM AND METHOD FOR ENABLING WIRELESS COMMUNICATIONS WITH CELL COORDINATION

This application claims the benefit of U.S. Provisional Application No. 61/144,370, filed on Jan. 13, 2009, entitled "System and Method for Implementing a Restricted PMI Scheduler with Cell Coordination," which application is hereby incorporated herein by reference.

TECHNICAL FIELD

The present invention relates generally to wireless communications, and more particularly to a system and method for enabling wireless communications with cell coordination.

BACKGROUND

In general, wireless communications systems using beamforming make use of a number of transmit and/or receive antennas and signal processing to create fixed or adaptive transmit/receive beam patterns. The beam patterns may have a directional nature that may result in a performance improvement when compared with unidirectional transmit and/or receive antennas. The use of the beam patterns may yield a transmit/receive gain over wireless communications systems using unidirectional transmit and/or receive antennas.

As such, beamforming has been promoted as a promising technique to increase cell coverage and to improve cell edge spectral efficiencies. However, one main drawback of beamforming is the so called flashlight effect where the channel quality changes between user equipment (UE) measurement and reporting, and NodeB (NB) transmission, due to the changes in the beam pattern of the interfering neighbouring cells.

Other commonly used and typically interchangeable terms for UE may include mobile station, user, terminal, access terminal, subscriber, and so forth, while controller, base station, enhanced NodeB, base terminal station, and so on, may be commonly used terms for NB.

Coordinated beamforming/switching has been suggested as a possible solution to this problem (see C80216m-08_487, Alcatel_Lucent, "Grid-of-Beams (GoB) Based Downlink Multi-User MIMO", IEEE802.16m, May 2008; and NTT DoCoMo, "Proposals for LTE-Advanced technologies", R1-082575, Warsaw, Poland, Jun. 30-Jul. 4, 2008").

Beam switching may provide good performance in heavily loaded cells since there are always UEs that may optimally benefit from a limited number of beams somewhere in the band. The heavily loaded cells ensure that for each beam transmitted by a NB, there are UEs that reported the transmitted beam as a preferred beam.

SUMMARY OF THE INVENTION

These and other problems are generally solved or circumvented, and technical advantages are generally achieved, by embodiments of a system and method for enabling wireless communications with cell coordination.

In accordance with an embodiment, a method for communications controller operation is provided. The method includes transmitting a reference signal, and receiving a report from at least one communication device. The communications device is served by the communications controller, and the report includes an indicator of a preferred precoding matrix. The method also includes selecting a downlink (DL) transmission intended for the communications device, scheduling a transmission opportunity for the communications device, and transmitting the DL transmission to the communications device. The scheduling is based on the received report, and the DL transmission is transmitted at an occurrence of the transmission opportunity.

In accordance with another embodiment, a method for communications device operation is provided. The method includes measuring a reference signal transmitted by a communications controller, determining a preferred precoding matrix based on the measurement of the reference signal, reporting the preferred precoding matrix to the communications controller, and receiving a transmission from the communications controller. The communications controller is serving the communications device, and the transmission is precoded by the preferred precoding matrix or another precoding matrix belonging to a same beam group as the preferred precoding matrix.

In accordance with another embodiment, a communications controller is provided. The communications controller includes a processor configured to execute programs and applications, a transmit and receive circuit coupled to the processor and to an antenna, a scheduler coupled to the processor, and a memory coupled to the processor. The transmit and receive circuit processes received transmissions and prepares transmissions for transmission, and the memory stores applications, programs, and beam groups. The scheduler schedules transmissions to at least one communications node based on a preferred precoding matrix reported by the communications node. The transmissions to the communications node are scheduled on a beam corresponding to the preferred precoding matrix or a beam belonging to a beam group that also contains the beam corresponding to the preferred precoding matrix.

An advantage of an embodiment is that beam switching performance may be achieved in lightly loaded communications systems with or without coordination between NBs.

A further advantage of an embodiment is that increased flexibility is provided for UE scheduling since all of the beams within a single group may be used to schedule a UE instead of a single beam. The groups of beams may be defined to optimize coordination versus multi-user diversity gain.

Yet another advantage of an embodiment is that cycling through beams may be performed in a synchronized fashion by cycling through the groups of beams by a cluster of NBs, where the cycling may be performed to minimize interference as well as spatial collisions between NBs.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the embodiments, and the advantages thereof, reference is now made to the following descriptions taken in conjunction with the accompanying drawings, in which.

DETAILED DESCRIPTION OF ILLUSTRATIVE EMBODIMENTS

The making and using of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The embodiments will be described in a specific context, namely a wireless communications system with NodeBs (NB) using beamforming to transmit to User Equipment (UE) using directional beam patterns, where the transmissions of the NBs may or may not be synchronized with one another. The invention may be applied to wireless communications systems using a wide range of wireless access technologies, such as LTE, LTE-Advanced, and so forth. Additionally, the invention may also be applied to NBs using non-directional beam patterns.

Figure 1:
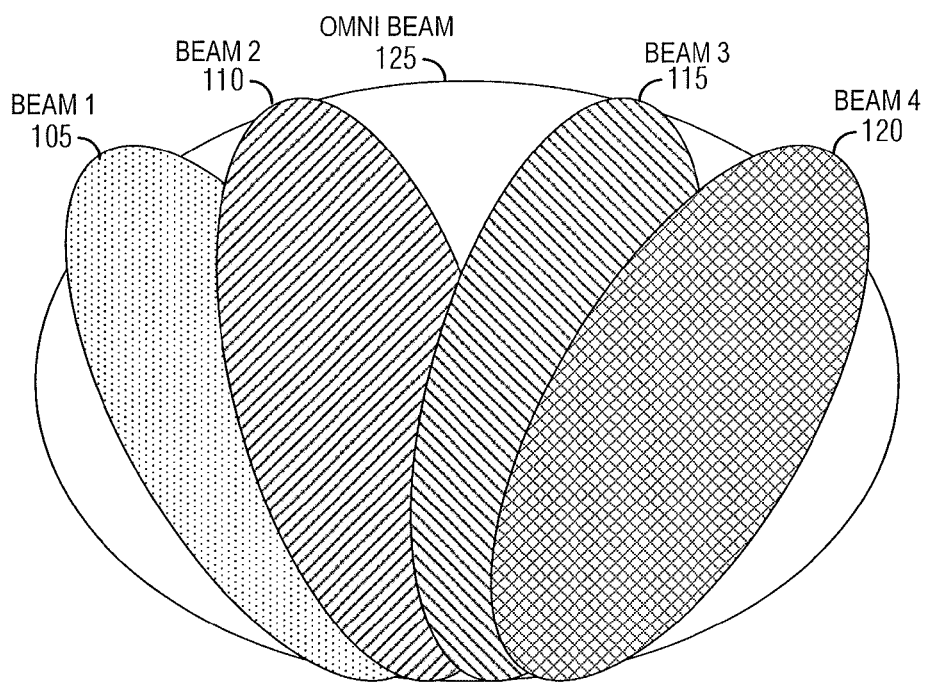
FIG. 1 is a diagram of possible antenna beams from a plurality of antennas.

FIG. 1 illustrates possible antenna beams from a plurality of antennas. As shown in FIG. 1, there are four directional antenna beams, such as directional antenna beam "BEAM 1" 105, directional antenna beam "BEAM 2" 110, directional antenna beam "BEAM 3" 115, and directional antenna beam "BEAM 4" 120, corresponding to different transmission antennas. FIG. 1 also illustrates an omnidirectional beam 125 that may correspond to the use of all antennas in the plurality of antennas to transmit the signal to be transmitted. The beams (beams 105 through 120) may be used by a NB to transmit to UEs that report a particular beam as a preferred beam.

However, in lightly loaded cells, where there may not be any UEs for each beam transmitted by the NB, precoding matrix indication (PMI) reports from UEs may provide good overall performance, especially in communications systems using a large codebook. In PMI reporting every UE gets a chance to be scheduled using a beam corresponding to its preferred PMI at every scheduling instant.

Therefore, additional flexibility in the scheduling of UEs as well as the beams transmitted by the NBs may afford PMI reporting-like performance with interference avoidance coordination provided in coordinated beam switching. Limited usage of PMI reports may be combined with beam switching to improve the performance of beam switching in lightly loaded cell situations. The use of limited usage of PMI reports in combination with beam switching may be referred to as restricted/grouped PMI scheduling.

Figure 2A:
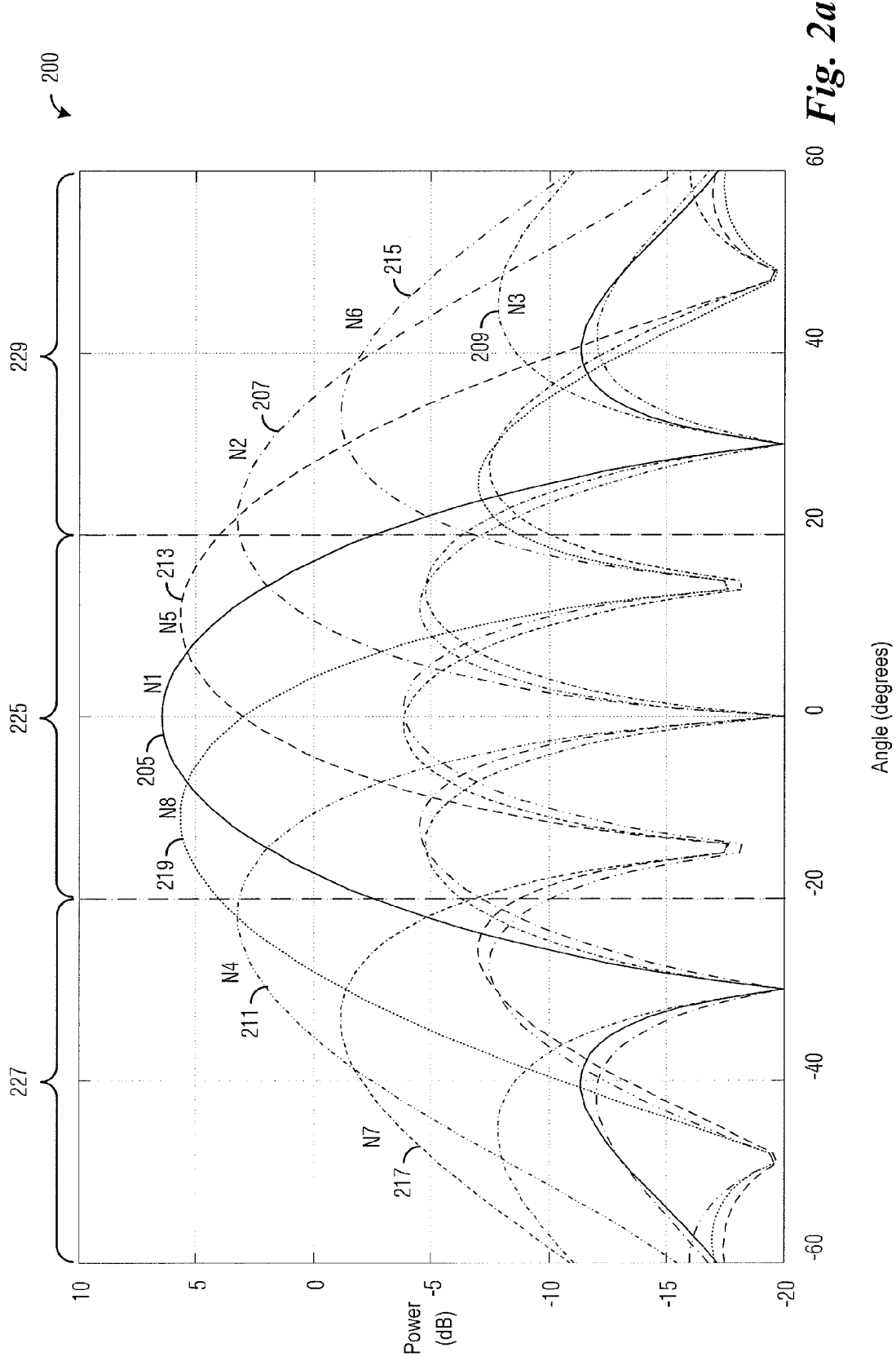
FIG. 2a is a plot of beam patterns for a number of beams.

FIG. 2a illustrates a plot 200 of beam patterns for a number of beams. Plot 200 illustrates beam patterns of beams of a codebook used in LTE. The codebook includes eight beams, including beam "N1" 205, beam "N2" 207, beam "N3" 209, beam "N4" 211, beam "N5" 213, beam "N6" 215, beam "N7" 217, and beam "N8" 219. The eight beams shown in FIG. 2a may be divided into three beam groups, with each beam group covering a 40 degree portion of a 120 degree sector. A first beam group 225 referred to as center group spans from −20 degrees to +20 degrees and includes beams "N1" 205, "N5" 213, and "N8" 219. A second beam group 227 referred to as left group spans from −60 degrees to −20 degrees and includes beams "N4" 211 and "N7" 217, while a third beam group 229 referred to as right group spans from +20 degrees to +60 degrees and includes beams "N2" 207 and "N6" 215. Beam "N3" 209 may be an omnidirectional beam and may not be useful in restricted/grouped PMI scheduling. Therefore, beam "N3" 209 may be omitted from any of the three beam groups.

Contrasted with beam switching, restricted/grouped PMI scheduling may use a larger number of beams, with each beam potentially covering a smaller portion of a sector. Furthermore, the beams may be partitioned into beam groups based on sector coverage area. The beams within a single beam group may be used interchangeably with one another without incurring a significant performance loss or a significant interference increase.

Although the discussion of FIG. 2a illustrates a communications system with a codebook with eight beams partitioned into three beam groups, the embodiments may be operable with a codebook with any number of beams that may be partitioned into any number of beam groups (as long as there is at least one beam per group). Typically, a number of partitions are selected so that each beam group may have two or more beams. If each beam group has a single beam, then restricted/grouped PMI scheduling may become beam switching. Therefore, the discussion of a codebook with eight beams partitioned into three beam groups should not be construed as being limiting to either the scope or the spirit of the embodiments.

Figure 2B:
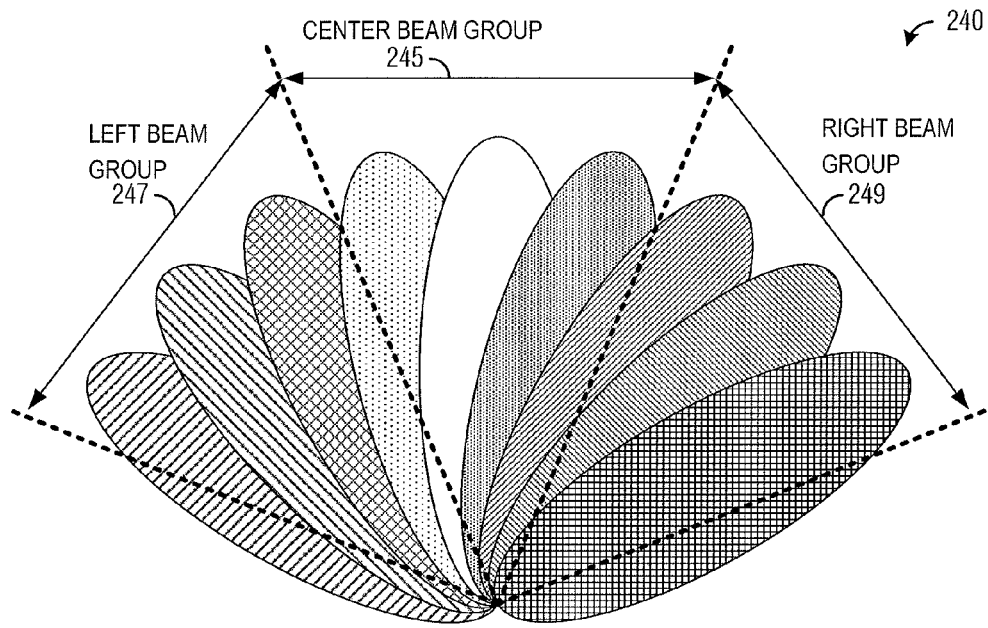
FIG. 2b is a plot of main lobes of a number of beams.

FIG. 2b illustrates a plot 240 of main lobes of a number of beams. As shown in FIG. 2b, nine beams may be partitioned into three beam groups (center group 245, left group 247, and right group 249) of three beams each. Although shown to span about equal portions of a sector, the beam groups may be partitioned so that each beam group may span a different portion of a sector. For example, in an alternate beam grouping, a center beam group may span a larger portion of a sector than a left beam group or a right beam group.

Figure 2C:
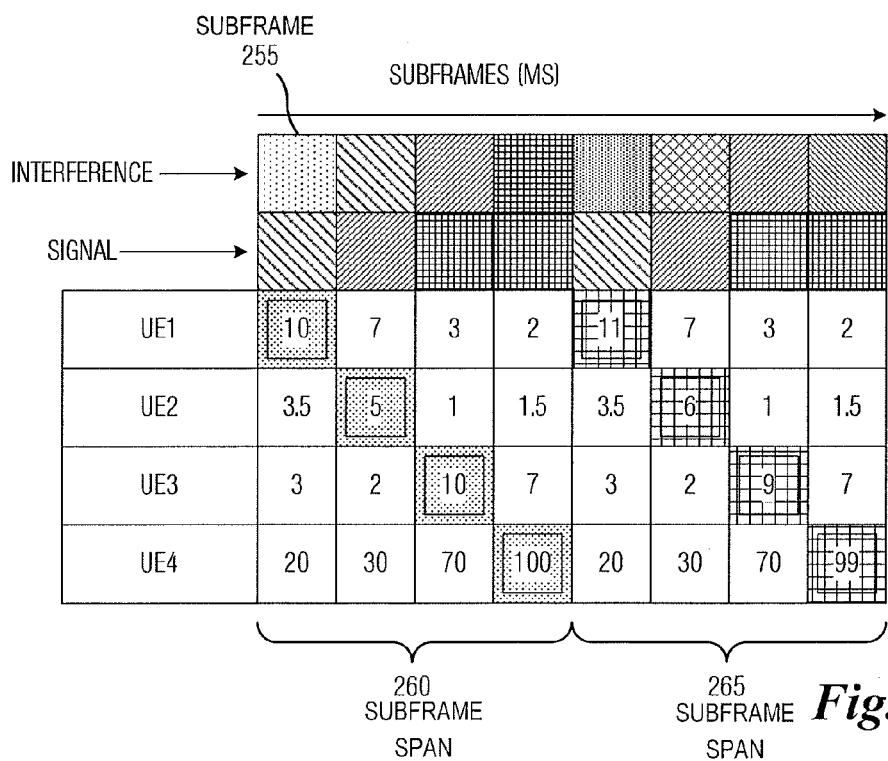
FIG. 2c is a diagram of channel quality indicator (CQI) as reported by UEs.

FIG. 2c illustrates a diagram of channel quality indicator (CQI) as reported by UEs. FIG. 2c also illustrates a scheduling of subframes in the time domain. CQI, as reported by a number of UEs, is shown for different subframes. For example, at subframe 255, UE1 reported a CQI of 10, while UE2 reported a CQI of 3.5, UE3 reported a CQI of 3, and UE4 reported a CQI of 20. A maximum CQI for each UE is shown highlighted in shaded boxes with smaller sub-squares, with a maximum CQI for UE1, UE2, UE3, and UE4, being 10, 5, 10, and 100, respectively. Spans 260 and 265 highlight two beam group cycles, respectively.

Subframes that yielded maximum CQIs for each of the UEs in span 260 may not yield an identical CQI for each of the UEs in span 265. For example, in span 260, UE1 reported a maximum CQI of 10, but in span 265, UE reported a maximum CQI of 11. A difference in the maximum CQI may be due to a NB transmitting a different beam within a beam group. Although the maximum CQI values may differ between spans, subframes that correspond to the maximum CQI remains consistent between spans.

Figure 3A:
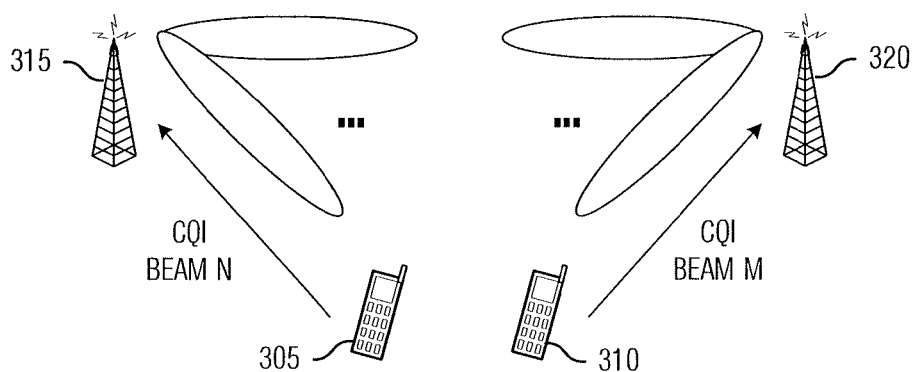
FIG. 3a is a diagram of the operation of two UEs operating in two adjacent NBs.

FIG. 3a illustrates the operation of two UEs operating in two adjacent NBs. A first UE "UE1" 305 may measure transmissions from a first NB "NB1" 315 and a second UE "UE2" 310 may measure transmissions from a second NB "NB2" 320 to determine the best CQI, which it may report back to its respective serving NB. The transmissions made by the NBs may be made with different antenna beams at different times. Then, transmissions to the UEs may be made using a beam within a beam group corresponding to a PMI reported to the NBs by the UEs. As an example, if second UE 310 reports a PMI corresponding to a beam of a given beam group, then its serving NB (NB 320) may select to schedule second UE 310 using any beam within the given beam group. If possible, the serving NB may select the beam that second UE 310 reported (i.e., the reported beam), but the serving NB may not have to use the reported beam.

Figure 3B:
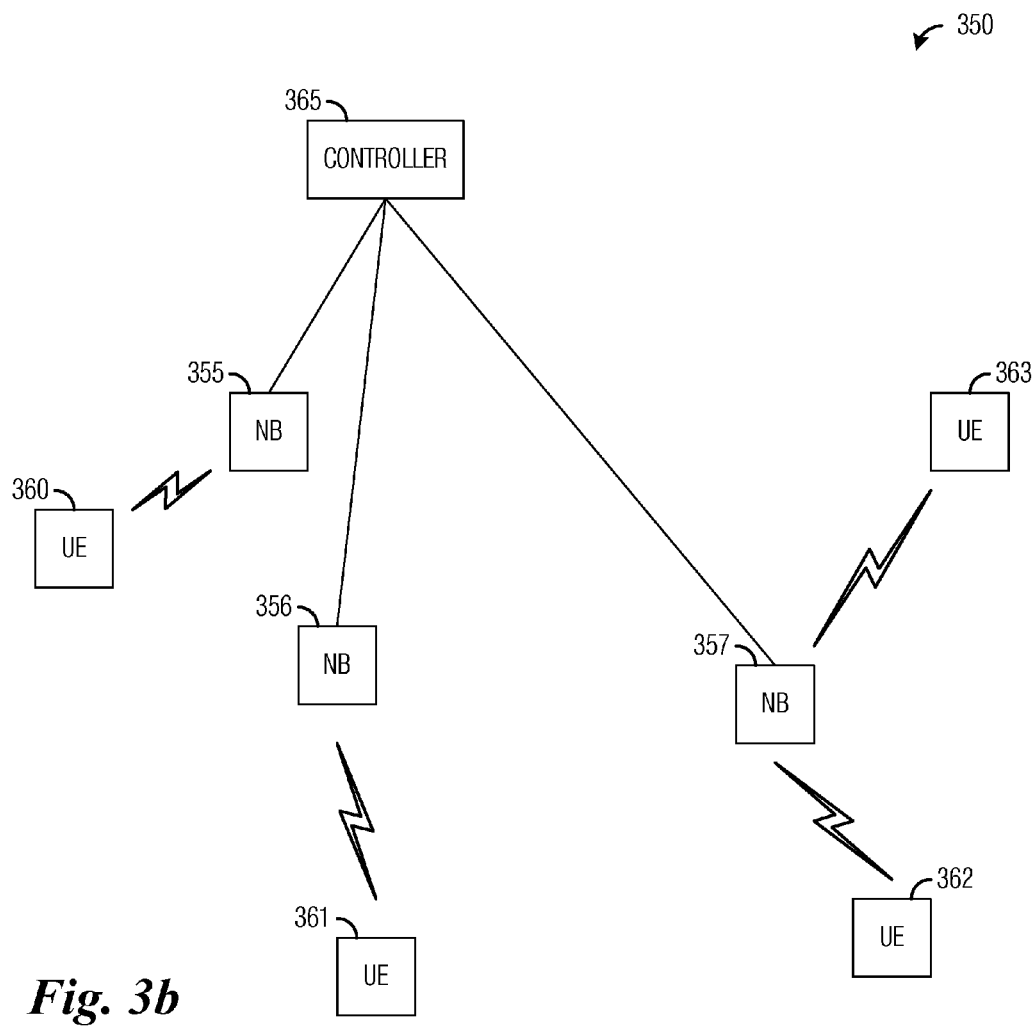
FIG. 3b is a diagram of a wireless communications system.

FIG. 3b illustrates a wireless communications system 350. Wireless communications system 350 includes a number of NBs, such as NB 355, NB 356, and NB 357. Each of the NBs may be responsible for allocating network resources to UEs, such as UE 360, UE 361, UE 362, and UE 363, that it is serving. For example, a NB may forward a transmission intended for a UE that it is serving or allocate some network resources to a UE that it is serving so that the UE may transmit information.

Some or all of the NBs in wireless communications system 350 may be operating in a restricted/grouped PMI scheduling mode. The NBs that are operating in a restricted/grouped PMI scheduling mode may be referred to as being in an inuse subset of all of the NBs since not all NBs are required to participate in restricted/grouped PMI scheduling mode. The NBs that are operating in a restricted/grouped PMI scheduling mode may each transmit pilots. The NBs may then receive preferred PMIs from the UEs that it is serving. The PMIs received from the UEs may be used with or without coordination with other NBs to schedule transmissions to the UEs.

In a situation when not all of the NBs in wireless communications system 350 is operating in a restricted/grouped PMI scheduling mode, then if the NB has a neighboring NB that is not operating in a restricted/grouped PMI scheduling mode (for example, the neighboring NB may be operating in spatial multiplexing or transmit diversity modes), then the CQI measurements made by UEs of the NB may be impacted by transmissions made by the neighboring NB that occur at the same time and frequency as the pilots transmitted by the NB.

Although each NB or each cell may have a beam group cycling pattern with a different period, there may be a global beam group cycling pattern period for all NBs operating in the restricted/grouped PMI scheduling mode. A controller 365 connected to the NBs may specify the global beam group cycling pattern period based on individual beam group cycling pattern periods from each of the NBs or cells. The global beam group cycling pattern period may be a smallest multiple of all of the individual beam group cycling pattern periods. For example, if three NBs are participating in the restricted/grouped PMI scheduling mode with individual beam group cycling pattern periods of four (4), four (4), and eight (8), respectively, then the global beam group cycling pattern period may be eight (8). Alternatively, the global beam group cycling pattern period may be 16, 24, or so forth.

Figure 3C:
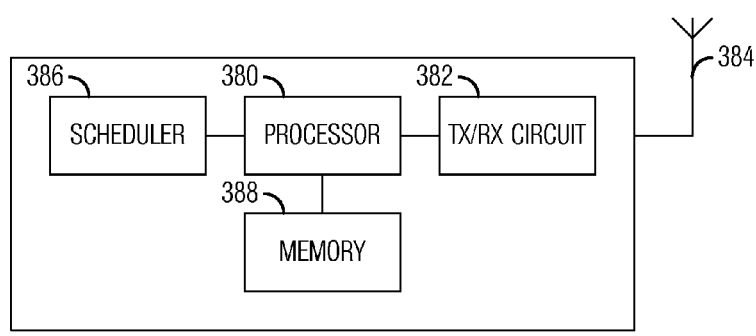
FIG. 3c is a diagram of a NB.

FIG. 3c illustrates a NB 375. NB 375 may control communications to and from UEs that it is serving. NB 375 may operate in several operating modes, including restricted/grouped PMI scheduling. NB 375 includes a processor 380 that may be used to run applications and programs. Processor 380 may also perform coordination with other NBs or a controller for the NBs to determine a beam group cycle pattern. The determining of a beam group cycle pattern is described in greater detail below.

NB 375 also includes a transmit/receive circuit 382 that may be used to process information/data to be transmitted as well as process received information/data. For example, transmit/receive circuit 382 may filter, amplify, error detect, error correct, encode, decode, and so forth, the information/data. The information/data may be received or transmitted by way of an antenna 384. Although shown as a single antenna, antenna 384 may be an antenna array of multiple antennas.

NB 375 further includes a scheduler 386 that may be used to schedule transmissions of information/data to UEs served by NB 375 using beams in beam groups. Scheduler 386 may or may not coordinate its beam groups with neighboring NBs. Scheduler 386 may make use of PMI received from UEs to schedule transmissions to the UEs. Although it may be preferred that scheduler 386 makes use of a UE's preferred beam (a beam corresponding to the PMI sent by the UE), scheduler 386 may instead use an alternate beam within a same beam group as the UE's preferred beam. For example, scheduler 386 may elect to use the alternate beam if more UEs have reported that they prefer the alternate beam.

Both scheduler 386 and processor 380 may be coupled together and to a memory 388. Memory 388 may be used to store applications and programs, as well as scheduling data, such as received PMI reports from the UEs served by NB 375. Memory 388 may also be used to store information about which network resources have been assigned to which UEs, as well as beam group cycle information, such as beam group cycle period, beam group cycle pattern, beams, beam groups, codebooks, and so on.

Restricted/grouped PMI scheduling may also make use of coordination between NBs to further reduce interference between the NBs, as well as reduce spatial collisions between transmissions in NBs. As an example, coordination between NBs may help to select which beam groups will be utilized by which NBs in certain transmission opportunities.

Figure 4A:
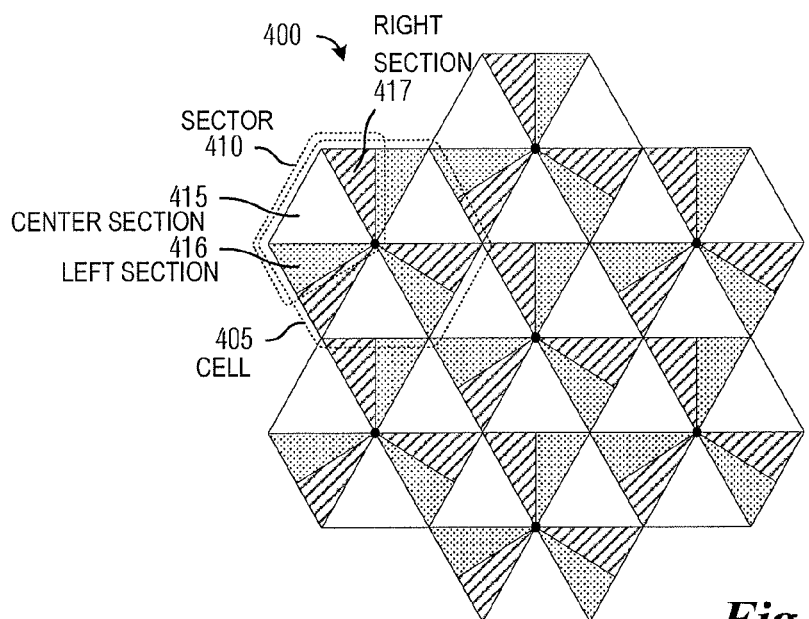
FIG. 4a is a diagram of a cluster cell layout.

FIG. 4a illustrates a cluster cell layout 400. Cluster cell layout 400 includes seven cells, such as cell 405, with each cell divided into three sectors, such as sector 410 of cell 405. Each sector may be further divided into three sections, such as center section 415, left section 416, and right section 417 of sector 410 of cell 405. As shown in FIG. 4a, a center section may span a larger portion of a sector than either a left section or a right section. A beam group used to cover the center section may include more beams or beams that individually span a larger area than beam groups used to cover either the left section or the right section.

Observations of cluster cell layout 400 indicate that simultaneous transmissions made in center sections of sectors of cells, such as center section 415, never collide, while simultaneous transmissions made in left sections of sectors of cells, such as left section 416, may result in three-way collisions. Similarly, simultaneous transmissions made in right sections of sectors of cells, such as right section 417, may result in three-way collisions. While simultaneous transmissions made in a left section of sectors of cells and a right section of sectors of cells do not collide.

Although the discussion of FIG. 4a focuses on a cell having three sectors with each sector having three sections, the embodiments may apply to cells having any number of sectors with each sector having any number of sections and different section proportions. Furthermore, the cells may have different numbers of sectors with each sector having a different number of sections. Therefore, the discussion of a three-sector cell with each sector having three sections should not be construed as being limiting to either the scope or the spirit of the embodiments.

Coordination between NBs may help to reduce and/or prevent collisions between transmissions made in the various sector sections by using time-division multiplexing (TDM) for the center, left, and right sections. The use of TDM may be independent of a number of antennas. The UEs served by the NBs may be aware of the independence of the number of antennas and may measure CQI accordingly. For example, a UE may report a CQI for a beam based on its selected PMI and a measured interference during a transmission opportunity that corresponds to the selected PMI's beam group is transmitted.

Figure 4B:
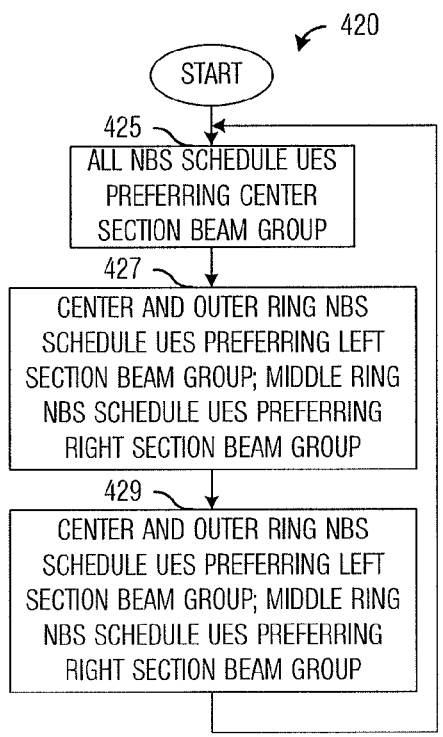
FIG. 4b is a flow diagram of scheduler operations in coordinated restricted/grouped PMI scheduling for a cluster of cells.

FIG. 4b illustrates a flow diagram of scheduler operations 420 in coordinated restricted/grouped PMI scheduling for a cluster of cells. Scheduler operations 420 may be indicative of operations in a scheduler of an NB in a cluster of NBs, wherein the NBs are operating in restricted/grouped PMI scheduling with coordination between the NBs in the cluster of NBs. Scheduler operations 420 may occur after coordination has been performed by the NBs between the NBs in the cluster of NBs or with a controller responsible for coordination between the NBs in the cluster of NBs.

According to an embodiment, scheduler operations 420 may be descriptive for a cluster of NBs having 19 NBs, with each NB being a three-sector NB with three sections per sector. Scheduler operations 420 may be readily modified for clusters of NBs of other sizes and/or sector/section arrangements. Therefore, the discussion of a 19 NB cluster of NBs wherein each NB is a three-sector NB with three sections per sector should not be construed as being limiting to either the scope or the spirit of the embodiments.

The 19 NB cluster of NBs may be arranged in multiple concentric rings starting at a center NB. FIG. 4c illustrates a cluster of 19 NBs 430. As shown in FIG. 4c, cluster of 19 NBs 430 includes a center NB 435 surrounded by an inner ring of six NBs 436 immediately adjacent to center NB 435. The inner ring of six NBs is surrounded by an outer ring of 12 NBs 437 immediately adjacent to the inner ring of six NBs.

Returning now to FIG. 4b, scheduler operations 420 may begin at a first transmission opportunity, in which all NBs may schedule UEs that reported selected PMIs belonging to a center section of sectors of cells (block 425). As the first transmission opportunity ends and a second transmission opportunity begins, to avoid transmission collisions and interference, a center NB and NBs in an outer ring of 12 NBs may schedule UEs that reported selected PMIs belonging to a left section of sectors of cells, while NBs in an inner ring of six NBs may schedule UEs that reported selected PMIs belonging to a right section of sectors of cells (block 427).

As the second transmission opportunity ends and a third transmission opportunity begins, to avoid transmission collisions and interference, a center NB and NBs in an outer ring of 12 NBs may schedule UEs that reported selected PMIs belonging to a right section of sectors of cells, while NBs in an inner ring of six NBs may schedule UEs that reported selected PMIs belonging to a left section of sectors of cells (block 427). Scheduler operations 420 may repeat in a cyclic manner. For example, every 3N-th transmission opportunity (N=0, 1, . . . ) may correspond to the first transmission opportunity, while every (3N+1)-th transmission opportunity may correspond to the second transmission opportunity and every (3N+2)-th transmission opportunity may correspond to the third transmission opportunity.

FIG. 4c illustrates sections of sectors being scheduled by schedulers of NBs in cluster of 19 NBs 430 during the third transmission opportunity, with dotted sections being left sections, hatched sections being right sections, and unshaded sections being sections not being scheduled.

Figure 4D:
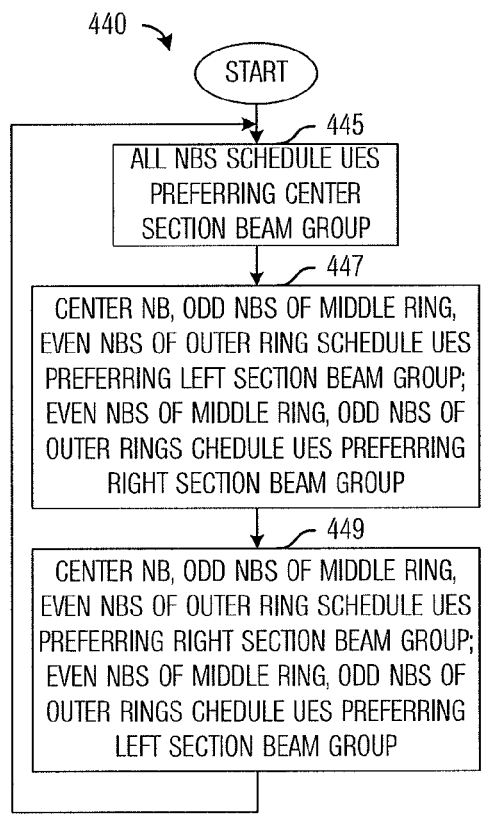
FIG. 4d is a flow diagram of scheduler operations in coordinated restricted/grouped PMI scheduling for a cluster of cells.
Figure 4C:
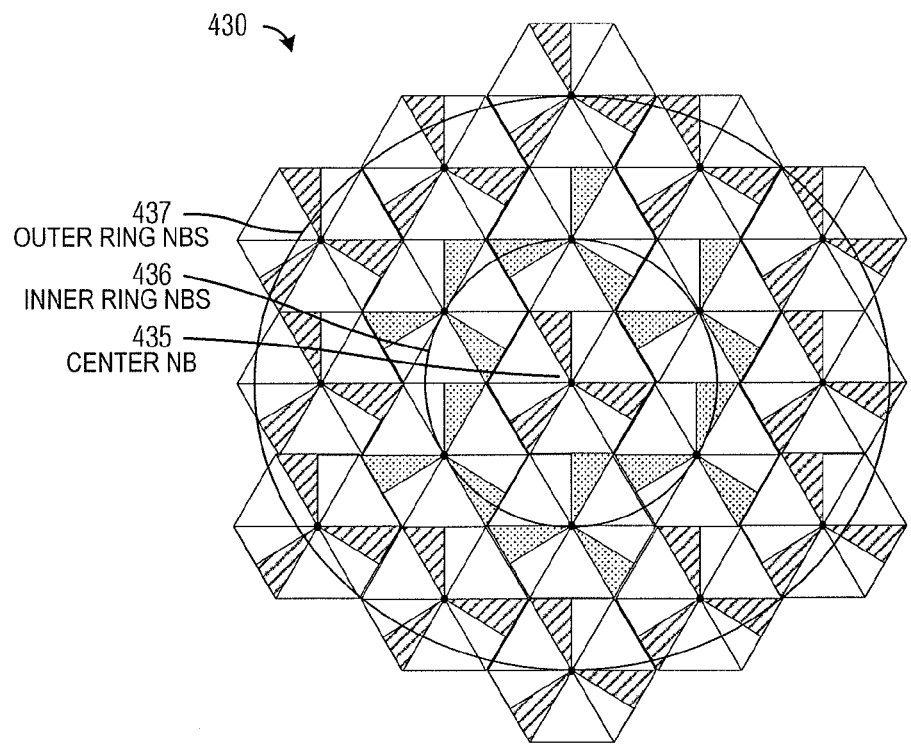
FIG. 4c is a diagram of sections of sectors being scheduled by schedulers of NBs in a cluster of 19 NBs during a transmission opportunity.

FIG. 4d illustrates a flow diagram of scheduler operations 440 in coordinated restricted/grouped PMI scheduling for a cluster of cells. Scheduler operations 440 may be indicative of operations in a scheduler of an NB in a cluster of NBs, wherein the NBs are operating in restricted/grouped PMI scheduling with coordination between the NBs in the cluster of NBs. Scheduler operations 440 may occur after coordination has been performed by the NBs between the NBs in the cluster of NBs or with a controller responsible for coordination between the NBs in the cluster of NBs.

According to an embodiment, scheduler operations 440 may be descriptive for a cluster of NBs having 19 NBs, with each NB being a three-sector NB with three sections per sector. Scheduler operations 440 may be readily modified for clusters of NBs of other sizes and/or sector/section arrangements. Therefore, the discussion of a 19 NB cluster of NBs wherein each NB is a three-sector NB with three sections per sector should not be construed as being limiting to either the scope or the spirit of the embodiments.

Scheduler operations 440 may begin at a first transmission opportunity, in which all NBs may schedule UEs that reported selected PMIs belonging to a center section of sectors of cells (block 445). As the first transmission opportunity ends and a second transmission opportunity begins, to avoid transmission collisions and interference, a center NB, odd numbered NBs of a middle ring of six NBs, and even numbered NBs of an outer ring of 12 NBs may schedule UEs that reported selected PMIs belonging to a left section of sectors of cells, while even numbered NBs of a middle ring of six NBs, and odd numbered NBs of an outer ring of 12 NBs may schedule UEs that reported selected PMIs belonging to a right section of sectors of cells (block 447). The NBs within a ring may be numbered sequentially from zero to N−1, where N is the number of NBs in the ring, for example.

As the second transmission opportunity ends and a third transmission opportunity begins, to avoid transmission collisions and interference, a center NB, odd numbered NBs of a middle ring of six NBs, and even numbered NBs of an outer ring of 12 NBs may schedule UEs that reported selected PMIs belonging to a right section of sectors of cells, while even numbered NBs of a middle ring of six NBs, and odd numbered NBs of an outer ring of 12 NBs may schedule UEs that reported selected PMIs belonging to a left section of sectors of cells (block 449). Scheduler operations 440 may repeat in a cyclic manner. For example, every 3N-th transmission opportunity (N=0, 1, . . . ) may correspond to the first transmission opportunity, while every (3N+1)-th transmission opportunity may correspond to the second transmission opportunity and every (3N+2)-th transmission opportunity may correspond to the third transmission opportunity.

Figure 4E:
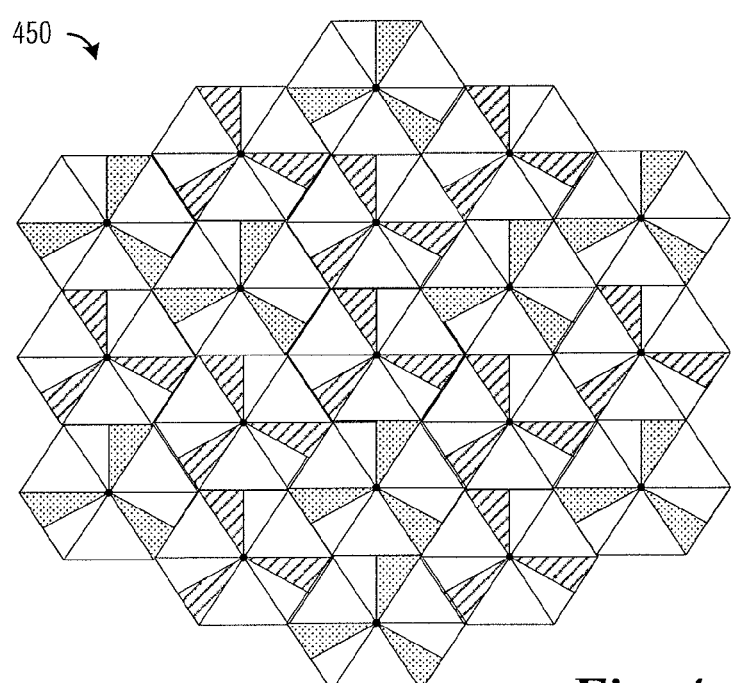
FIG. 4e is a diagram of sections of sectors being scheduled by schedulers of NBs in a cluster of 19 NBs during a transmission opportunity.

FIG. 4e illustrates sections of sectors being scheduled by schedulers of NBs in cluster of 19 NBs 450 during the third transmission opportunity, with dotted sections being left sections, hatched sections being right sections, and unshaded sections being sections not being scheduled.

Figure 5:
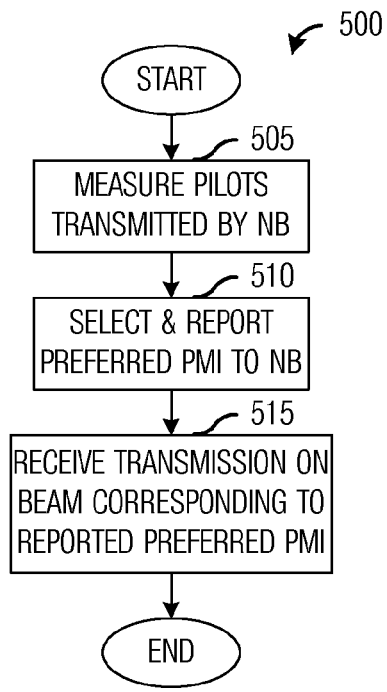
FIG. 5 is a flow diagram of UE operations in restricted/grouped PMI scheduling.

FIG. 5 illustrates a flow diagram of UE operations 500 in restricted/grouped PMI scheduling. UE operations 500 may be indicative of operations occurring in a UE as it is being served by a NB that is participating in restricted/grouped PMI scheduling. UE operations 500 may occur while the UE is being served by the NB and while the NB continues to participate in restricted/grouped PMI scheduling.

UE operations 500 may occur at scheduled intervals as specified by the NB, a controller of the NB, an operator of a communications system in which the UE and the NB are operating, a standard specification, or so on. Alternatively, UE operations 500 may occur upon a receipt of an instruction from the NB or the controller of the NB. The instruction may be due to the occurrence of an event, such as an overall performance of communications dropping below a threshold, an error rate exceeding a threshold, a failure to meet certain quality of service requirements, or so forth.

UE operations 500 may begin with the UE measuring non-beamformed pilots or reference sequences (RS) transmitted by the NB (block 505). Based on the measurements of the non-beamformed pilots or RS transmitted by the NB, the UE may select a preferred PMI and report the preferred PMI to the NB (block 510). The preferred PMI may correspond to a precoding matrix in a codebook used by both the UE and the NB that yields a best overall performance.

Since the preferred PMI may be selected from the non-beamformed pilots or RS, the measurements may be an accurate representation of the communications channel between the NB and the UE. Additionally, the UE may have greater freedom to pick the preferred PMI from the codebook. The preferred PMI may correspond to a beam that may produce a maximum channel measurement, for example. Then, based on the reported preferred PMI, the UE may receive a transmission beamformed by a precoding matrix corresponding to the preferred PMI or by a precoding matrix that belongs in the same beam group as the preferred PMI (block 515). UE operations 500 may then terminate.

Figure 6:
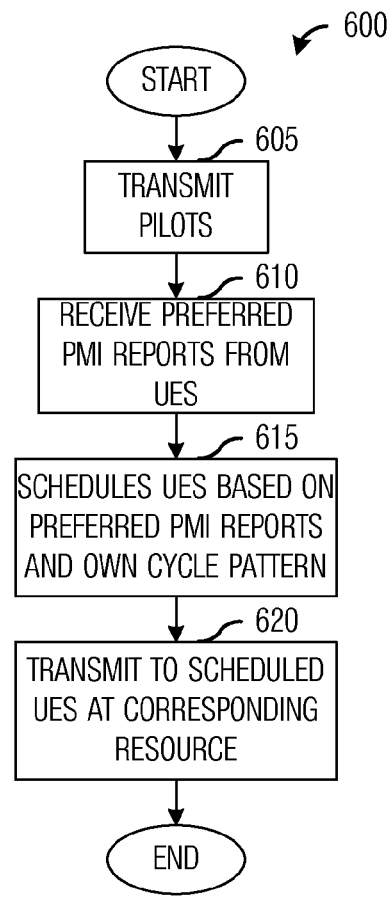
FIG. 6 is a flow diagram of NB operations in restricted/grouped PMI scheduling.

FIG. 6 illustrates a flow diagram of NB operations 600 in restricted/grouped PMI scheduling. NB operations 600 may be indicative of operations occurring in a NB as it participates in restricted/grouped PMI scheduling and serves one or more UEs. NB operations 600 may occur while the NB is serving UEs and while the NB continues to participate in restricted/grouped PMI scheduling.

NB operations 600 may begin with the NB transmitting non-beamformed pilots or RS to UEs that it is serving (block 605). The NB may then receive preferred PMI reports from the UEs that it is serving (block 610). The NB may then schedule transmissions to UEs that reported preferred PMIs (block 615). The transmissions may be scheduled on beams that actually correspond to the preferred PMIs reported by the UEs or on a different beam but the different beam is a member of the same beam group as the beam that corresponds to the preferred PMI.

The scheduling of the transmissions to the UEs may occur with or without coordination with neighboring NBs. If no coordination is performed, then the NB may utilize beams and beam groups based on its own internal ordering without consideration given to interference caused to neighboring NBs. If coordination is performed, then the NB may utilize beams and beam groups based on a beam group cycling pattern determined during coordination. Detailed descriptions of the scheduling of transmissions to UEs with and without coordination with other NBs are provided below.

Once the UEs have been scheduled, the NB may transmit to the UEs when scheduled transmission opportunities for the UEs arise (block 620). NB operations 600 may then terminate.

Figure 7A:
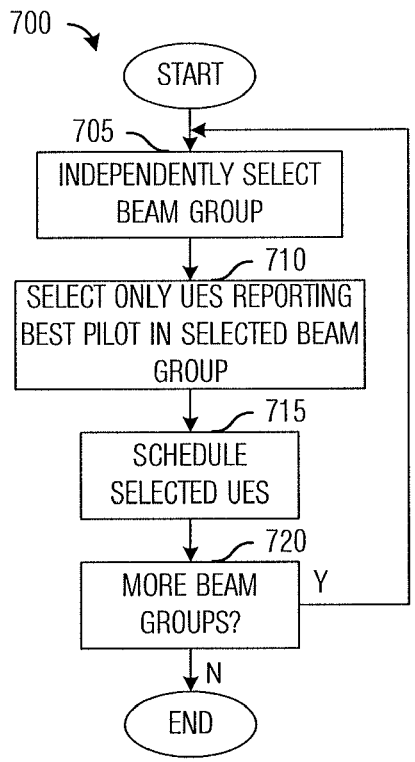
FIG. 7a is a flow diagram of NB operations of scheduling UEs in restricted/grouped PMI scheduling without coordination with other NBs.

FIG. 7a illustrates a flow diagram of NB operations 700 of scheduling UEs in restricted/grouped PMI scheduling without coordination with other NBs. NB operations 700 may be indicative of operations occurring in a NB that is participating in restricted/grouped PMI scheduling without coordination with other NBs. Specifically, NB operations 700 may occur in a scheduler of the NB as it schedules the UEs that it is serving based on preferred PMI reported by the UEs. NB operations 700 may occur as long as the NB has UEs to serve and while the NB continues to participate in restricted/grouped PMI scheduling.

NB operations 700 may begin with the NB selecting a beam group from a set of possible beam groups (block 705). Without coordination, the NB substantially independently selects the beam group. The NB may select the beam group based on reported preferred PMIs received from the UEs that it is serving, along with other information, such as historical information, fairness information, quality of service requirements, transmission priority, and so forth. For example, the NB may select a beam group containing beams that were reported as preferred PMIs by the most UEs. Alternatively, the NB may select a beam group that it has not selected in a specified period of time, a beam group containing a UE that has a transmission with high priority, a beam group containing a UE with a specified quality of service requirement, or so on.

After selecting the beam group, the NB may then select only UEs that have reported preferred PMIs corresponding to beams in the beam group (block 710). The UEs may be selected based on criteria such as amount of buffered information, UE priority, historical information, quality of service requirements, beam capacity, multiuser diversity gain, and so forth. The selected UEs may be schedule for transmissions using one or more beams of the beam group (block 715). The NB may select one or more beams from the beam group to use in its transmissions based on considerations such as a number of selected UEs, distribution of the selected UEs, the reported PMIs of the selected UEs, beam capacity, multiuser diversity gain, and so on.

After scheduling selected UEs to the selected beam group, the NB may perform a check to determine if there are additional beam groups to select and schedule (block 720). If there are additional beam groups to select and schedule, then the NB may return to block 705 to select another beam group and the scheduling of UEs to the selected beam group may repeat. If there are no additional beam groups to select and schedule, then NB operations 700 may terminate.

Figure 7B:
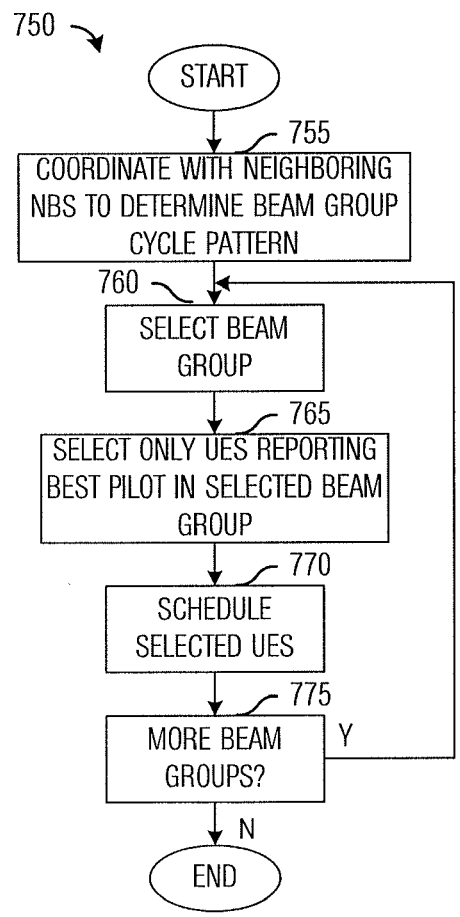
FIG. 7b is a flow diagram of NB operations of scheduling UEs in restricted/grouped PMI scheduling with coordination with other NBs.

FIG. 7b illustrates a flow diagram of NB operations 750 of scheduling UEs in restricted/grouped PMI scheduling with coordination with other NBs. NB operations 750 may be indicative of operations occurring in a NB that is participating in restricted/grouped PMI scheduling with coordination with other NBs. Specifically, NB operations 750 may occur in a scheduler of the NB as it schedules the UEs that it is serving based on preferred PMI reported by the UEs. NB operations

750 may occur as long as the NB has UEs to serve and while the NB continues to participate in restricted/grouped PMI scheduling.

NB operations 750 may begin with the NB coordinating with other NBs to determine a beam group cycle pattern (block 755). Coordination with other NBs may help in the determining of a beam group cycle pattern, such as those shown in FIGS. 4b and 4d, which may help to reduce inter-NB interference. As discussed previously, the determining of the beam group cycle pattern may be performed by the NBs collectively and then shared or a controller for the NBs may determine the beam group cycle pattern and provide the beam group cycle pattern to the NBs.

The NB may then select a beam group based on the beam group cycle pattern and a transmission opportunity that it is scheduling (block 760). For example, the NB may be restricted to selecting a particular beam group based on a number of the transmission opportunity. After selecting the beam group, the NB may then select only UEs that have reported preferred PMIs corresponding to beams in the beam group (block 765). The UEs may be selected based on criteria such as amount of buffered information, UE priority, historical information, quality of service requirements, beam capacity, multiuser diversity gain, and so forth. The selected UEs may be scheduled for transmissions using one or more beams of the beam group (block 770). The NB may select one or more beams from the beam group to use in its transmissions based on considerations such as a number of selected UEs, distribution of the selected UEs, the reported PMIs of the selected UEs, beam capacity, multiuser diversity gain, and so on.

After scheduling selected UEs to the selected beam group, the NB may perform a check to determine if there are additional beam groups to select and schedule (block 775). If there are additional beam groups to select and schedule, then the NB may return to block 760 to select another beam group and the scheduling of UEs to the selected beam group may repeat. If there are no additional beam groups to select and schedule, then NB operations 750 may terminate.

Figure 8:
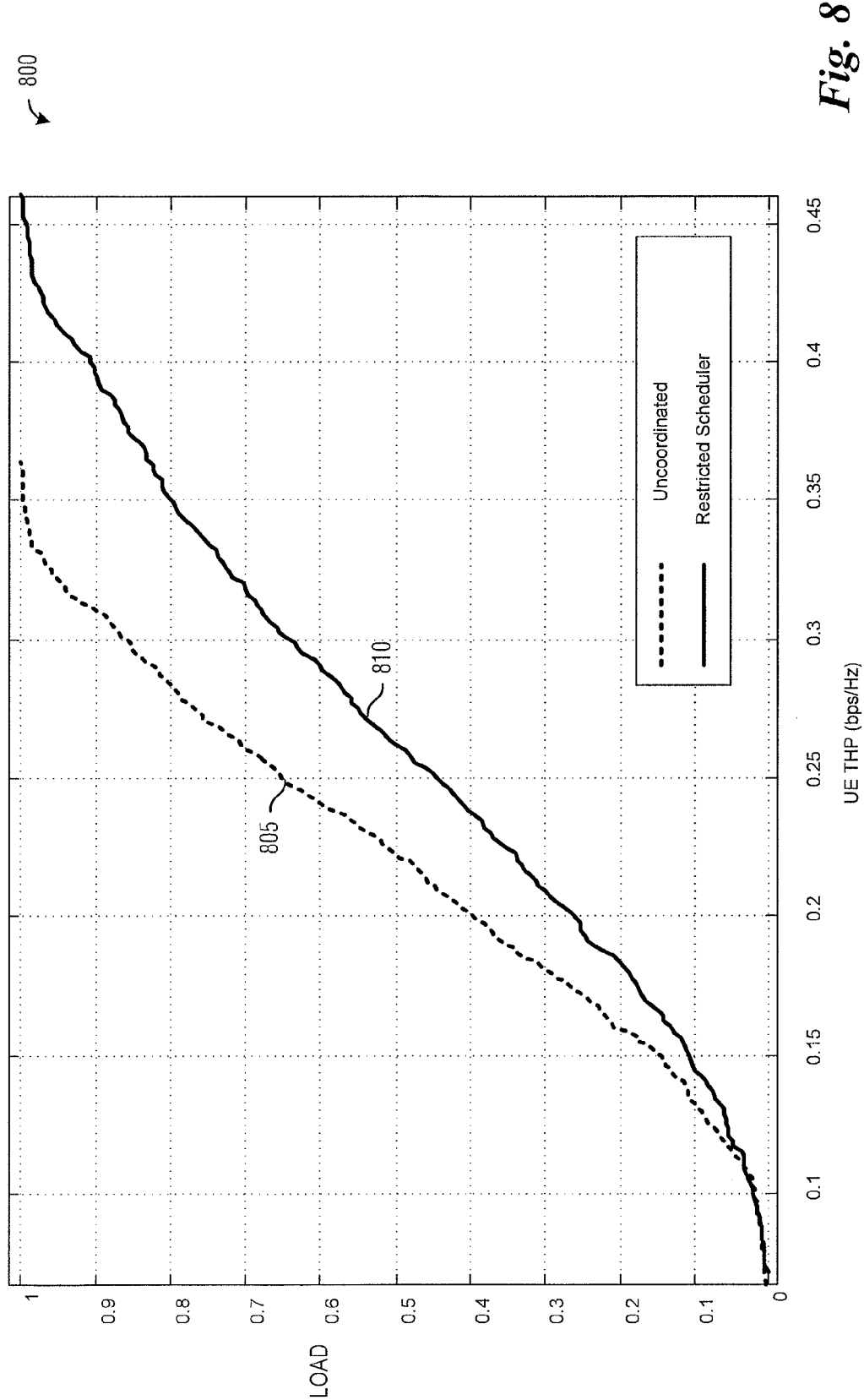
FIG. 8 is a data plot of UE performance for uncoordinated and coordinated restricted/grouped PMI scheduling.

FIG. 8 illustrates a data plot 800 of UE performance for uncoordinated and coordinated restricted/grouped PMI scheduling. Evaluation of uncoordinated and coordinated restricted/grouped PMI scheduling (shown as first trace 805 and second trace 810, respectively) shows that coordination may result in a total average throughput gain of about 20 percent and a cell edge throughput gain of about three percent. Evaluations were made for a communications system with a codebook of eight beams partitioned in to three beam groups. Table 1 presents a summary of communications system configuration and Table 2 presents a summary of performance results.

TABLE 1

| Communications System Settings. | |
| --- | --- |
| Number (Tx, Rx) | (4, 2) |
| Antenna Separation (Wavelength) | (0.5, 0.5) |
| Channel Model | SCM (Urban Macro, 8 degree spread) |
| Scheduler | Proportional Fair |
| Users per Cell | 10 |
| Control Overhead | None |
| HARQ | Persistent-ChaseCombining-HARQ |
| Receiver Processing | MRC |
| FFT size, Bandwidth | 1024, 10 MHz |
| STS Distance | 500 m |
| Link to System | Effective SNR/Mutual Information |
| Shadow Fading | 8 dB |

TABLE 1-continued

| Communications System Settings. | |
| --- | --- |
| Isolation | 20 dB |
| NB Tx Power | 40 W |
| Rank Adaptation | No |
| UE Speed | 3 km/h |
| Subband Size/Scheduling Unit | 5 RB's = 60 tones |

TABLE 2

| Performance Results. | | |
| --- | --- | --- |
| | UNCOORDINATED | COORDINATED |
| AVERAGE THROUGHPUT (BPS/HZ) | 2.2165 | 2.6664 |
| GAIN % | 0 | 20.30 |
| 5% CELL EDGE THROUGHPUT (BPS/HZ) | 0.1149 | 0.1192 |
| GAIN % | 0 | 3.75 |

Although the embodiments and their advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for operating a first communications controller, the first communications controller operating in a wireless communications system having other communications controllers, the method comprising:
coordinating, by the first communications controller, with the other communications controllers to determine a beam group cycle pattern;
transmitting a reference signal;
receiving a report from at least one communications device, wherein the communications device is served by the first communications controller, and wherein the report comprises an indicator of a preferred precoding matrix;
selecting a downlink (DL) transmission intended for the communications device;
scheduling a transmission opportunity for the communications device in accordance with the beam group cycle pattern and with the received report; and
transmitting the DL transmission to the communications device, at an occurrence of the transmission opportunity.

2. The method of claim 1, wherein scheduling a transmission opportunity is further based on a size of the DL transmission, a priority of the DL transmission, communications device priority, transmission history of the communications device, a quality of service requirement for the communications device, multiuser diversity gain for the communications device, and combinations thereof.

3. The method of claim 1, wherein scheduling a transmission opportunity comprises:
selecting a beam group from a plurality of beam groups; and
scheduling the transmission opportunity for the communications device if the preferred precoding matrix indicated by the communications device corresponds to a beam in the selected beam group.

4. The method of claim 3, wherein scheduling a transmission opportunity comprises scheduling the DL transmission to be transmitted using a single beam in the selected beam group.

5. The method of claim 3, wherein scheduling a transmission opportunity comprises scheduling the DL transmission to be transmitted using more than one beam in the selected beam group.

6. The method of claim 3, wherein scheduling a transmission opportunity comprises scheduling a portion of the DL transmission to be transmitted during the transmission opportunity.

7. The method of claim 3, wherein scheduling a transmission opportunity comprises scheduling the DL transmission to be transmitted on a beam corresponding to the preferred precoding matrix or a beam in the selected beam group.

8. The method of claim 3, further comprising repeating the selecting a beam group from a plurality of beam groups and the scheduling the transmission opportunity for the communications device if the preferred precoding matrix indicated by the communications device corresponds to a beam in the selected beam group, for other beam groups in the plurality of beam groups.

9. The method of claim 1, wherein coordinating comprises sharing the report with the other communications controllers.

10. The method of claim 1, wherein coordinating comprises sharing the report with a controller for the communications controllers.

11. The method of claim 1, wherein coordinating is based on a layout of the communications controllers and a configuration of each communications controller.

12. The method of claim 1, wherein scheduling a transmission comprises:
selecting a beam group based on the beam group cycle pattern and the transmission opportunity; and
scheduling the transmission opportunity for the communications device if the preferred precoding matrix indicated by the communications device corresponds to a beam in the selected beam group.

13. A method for operating a communications device, the communications device operating in a wireless communications system having a first communications controller and other communications controllers, the method comprising:
measuring, by the communications device, a reference signal transmitted by a first communications controller, wherein the first communications controller is serving the communications device;
determining a preferred precoding matrix based on the measurement of the reference signal;
reporting the preferred precoding matrix to the first communications controller; and
receiving a transmission from the first communications controller scheduled in accordance with a beam group cycle pattern determined by the first communications controller in coordination with the other communications controllers, wherein the transmission is precoded by the preferred precoding matrix or a different precoding matrix belonging to a same beam group as the preferred precoding matrix.

14. The method of claim 13, wherein reporting the preferred precoding matrix comprises reporting an indicator of the preferred precoding matrix.

15. The method of claim 13, wherein the preferred precoding matrix is selected from a codebook.

16. The method of claim 15, wherein the codebook is shared with the first communications controller.

17. A first communications controller configured to operate in a wireless communications system having other communications controllers, the first communications controller comprising:
a processor configured to execute programs and applications, and configured to coordinate with the other communications controllers to determine a beam group cycle pattern;
a transmit and receive circuit coupled to the processor and to an antenna, the transmit and receive circuit configured to process received transmissions and to prepare transmissions for transmission;
a scheduler coupled to the processor, the scheduler configured to schedule transmissions to at least one communications node in accordance with the beam group cycle pattern and with an indicator for a preferred precoding matrix reported by the communications node, wherein the transmissions to the communications node are scheduled on a beam belonging to a beam group that contains a beam corresponding to the preferred precoding matrix; and
a memory coupled to the processor, the memory configured to store the applications, programs, and beam groups.

18. The first communications controller of claim 17, wherein the processor configured to coordinate with the other communications controllers to determine a beam group cycle pattern comprises the processor configured to share the report with the other communications controllers.

19. The first communications controller of claim 17, wherein the processor configured to coordinate with the other communications controllers to determine a beam group cycle pattern comprises the processor configured to share the report with a controller for the communications controllers.

20. The method of claim 17, wherein the beam belonging to the beam group is other than the beam corresponding to the preferred precoding matrix.

21. A communications device, the communications device configured to operate in a wireless communications system having a first communications controller and other communications controllers, the communications device comprising:
a processor configured to execute programs and applications, and configured to:
measure a reference signal transmitted by the first communications controller serving the communications device,
determine a preferred precoding matrix based on the measurement of the reference signal, and
report the preferred precoding matrix to the first communications controller;
a transmit and receive circuit coupled to the processor and to an antenna, the transmit and receive circuit configured to:
transmit the preferred precoding matrix to the first communications controller, and receive a transmission from the first communications controller scheduled in accordance with a beam group cycle pattern determined by the first communications controller in coordination with the other communications controllers, wherein the transmission is precoded by the preferred precoding matrix or a different precoding matrix belonging to a same beam group as the preferred precoding matrix; and a memory coupled to the processor, the memory configured to store the applications, the programs, and a codebook.

22. The method of claim 21, wherein the processor configured to report the preferred precoding matrix comprises the processor configured to report an indicator of the preferred precoding matrix.

23. The method of claim 21, wherein the processor configured to determine the preferred precoding matrix comprises the processor configured to select the preferred precoding matrix from the codebook.

24. The method of claim 23, wherein the codebook is configured to be shared with the first communications controller.

* * * * *